Jan. 7, 1947.  H. C. KRONE ET AL  2,413,978
QUICK HOSE COUPLING
Filed May 8, 1945
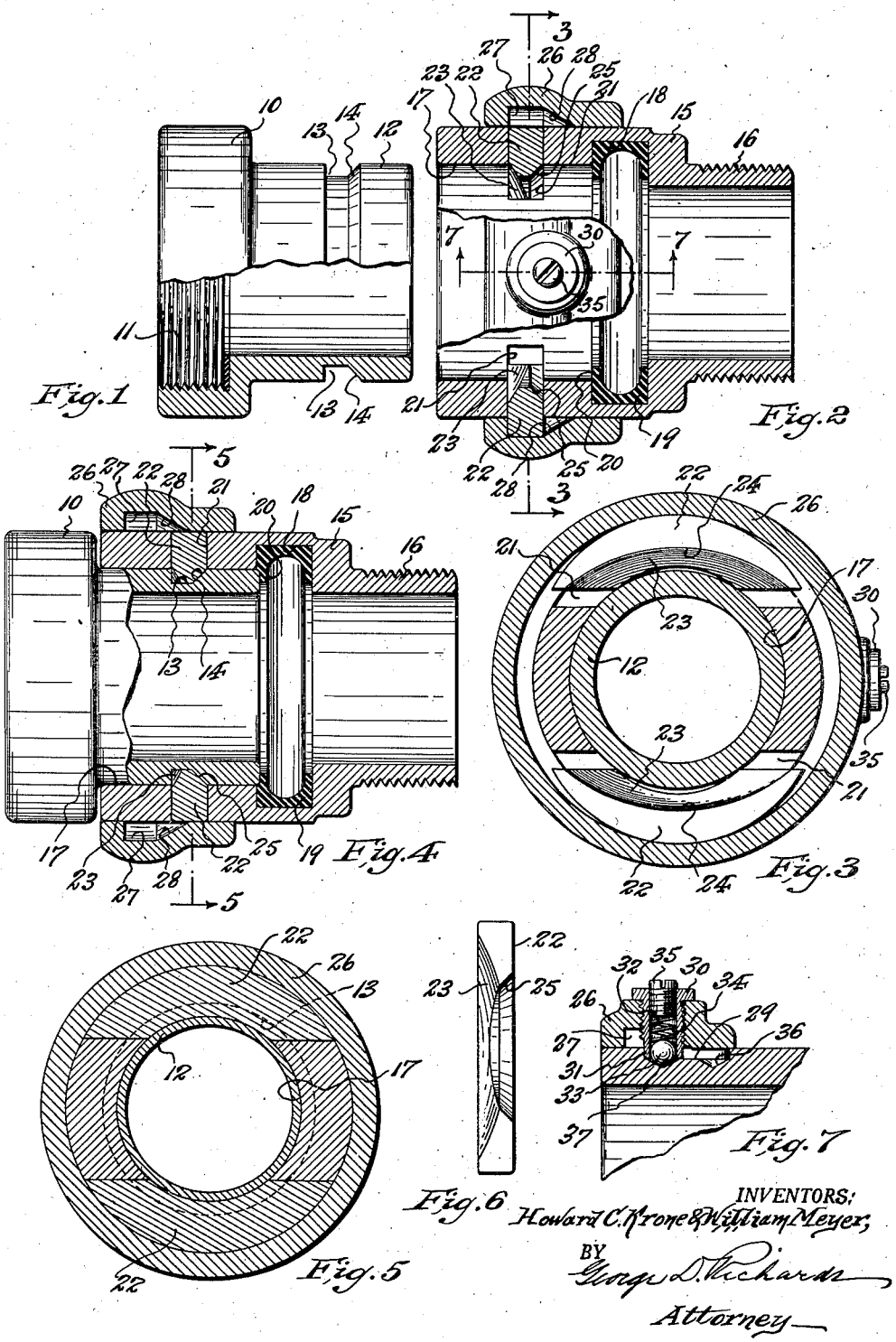

Patented Jan. 7, 1947

2,413,978

UNITED STATES PATENT OFFICE 2,413,978

QUICK HOSE COUPLING

Howard C. Krone, River Edge, and William Meyer, East Orange, N. J., assignors to Wheaton Brass Works, Newark, N. J., a corporation of New Jersey Application May 8, 1945, Serial No. 592,556

2 Claims. (Cl. 285—168)

1

This invention relates to improvements in hose couplings; and the invention has reference, more particularly to a novel hose coupling structure of the quick acting telescopic type.

The present invention has for an object to provide a telescopic coupling structure having novel means for both locking its separable male and female members against separation when they are joined together, while at the same time compressing therebetween a joint sealing packing or gasket.

The invention has for a further object to provide a telescopic coupling structure of the kind stated, wherein the means for locking the male and female members against separation and compressing therebetween a sealing or packing gasket comprises freely movable or floating latch segment means housed in the female member of the coupling, said latch segment means having outwardly presented contours of peculiar formation which, when engaged by the extremity of an entering male member of the coupling, effects yieldable displacement thereof, whereby to offer no obstruction or resistance to the inward movement of said male member; said latch segment means being further provided with inwardly presented camming means adapted to cooperate with camming means of an annular latch socket or channel with which said male member is provided for the reception of said latch segment means, whereby to exert a substantial thrusting pressure of the male member extremity against a sealing or packing gasket, so as to effect a tight leak-proof joint between the engaged male and female members of the coupling; said female member of the coupling being provided with an external slide ring which is manipulatable to move the latch segment means into operative latching engagement with the male member of the coupling, when the latter is entered in said female member.

Other objects of this invention, not at this time more particularly enumerated, will be understood from the following detailed description of the same.

An illustrative embodiment of the present invention is shown in the accompanying drawing, in which:

Fig. 1 is a side elevational view in part section of the male member of the coupling structure; and Fig. 2 is a sectional view in part elevation of the female member of the coupling structure.

Fig. 3 is a cross-sectional view, taken on line 3—3 in Fig. 2, but showing the latch segment means as retracted by the entering extremity of the male member of the coupling structure.

Fig. 4 is a longitudinal sectional view of the male and female members of the coupling structure as operatively engaged together and locked by the latch segment means against separation, and as thrusting compressively against a sealing or packing gasket, whereby to effect a tight leak-proof joint therebetween; and Fig. 5 is a cross-sectional view, taken on line 5—5 in Fig. 4.

Fig. 6 is an internal edge elevational view of a novel latch segment device made according to this invention.

Fig. 7 is a fragmentary longitudinal sectional view, taken on line 7—7 in Fig. 2, showing a detent means with which the slide ring of the coupling structure is provided, but showing said slide ring advanced to latch segment operating and holding position.

Similar characters of reference are employed in the hereinabove described views, to indicate corresponding parts.

Referring to the drawing, the reference character 10 indicates the male member of the coupling structure, which, as shown, is provided with an internally screw-threaded socket 11 to receive the threaded end of a conduit or the like (not shown). At its forward end, the male member is provided with a spigot portion 12, usually of cylindrical shape. Formed in the external surface of said spigot portion 12 is an annular channel or latch socket 13 which is spaced inwardly from the free extremity thereof. The forward wall of said latch socket 13 is formed to provide an annular downwardly and inwardly inclined female camming portion 14, the purpose of which will be hereinafter explained.

The reference character 15 indicates the female member of the coupling structure, the same being suitably constructed, as e. g. by an externally screw-threaded rear end section 16, for attachment to a conduit or the like (not shown). At its forward end, the female member is provided with a bell-portion 17, the internal diameter of which is sized to slidingly or telescopically receive the spigot portion 12 of the male member 10. Provided in the interior of the female member, intermediate its rear end section 16 and bell-portion 17, is an annular seating channel or groove 18 to receive and seat a sealing or packing gasket 19, in such manner that a marginal portion 20 thereof extends into and is exposed within the bell-portion interior at the back or inner end of the latter.

The means for securing the coupling members in connected together and joint sealing relation comprises one or more arcuate latch segments which are mounted for free or floating radial movement in transverse housing openings or slots 21 provided in the walls of the bell portion 17 of the female member 15. Preferably at least two such latch segments are employed, the same being disposed in diametrically opposed relation; it will be understood, however, that in large size couplings, more than two such latch segments may be utilized, suitably spaced apart around said bell portion 17.

Each latch segment comprises an arcuate body 22 of an overall width corresponding to the maximum width of the annular latch socket 13 of the male member spigot portion 12, and of a medial vertical thickness or height substantially corresponding to the thickness of the female member bell portion wall plus the depth of the latch socket 13 of said male member spigot portion 12.

The outwardly presented or forward face of each latch segment 22, i. e. the face thereof opposed to the open end of the female member bell portion 17, is formed along its inner marginal portion with a concave or hollow spherical segmental surface 23 to extend in substantially inwardly and downwardly angular relation to the forward face plane of the latch segment body. The radius of the peripheral curve 24 where said surface intersects said forward face plane of the latch segment body is eccentric to the curvature of the latter and of greater radius than the internal radius of the bell-portion 17, and consequently likewise greater than the radius of the male member spigot portion 12. Said concave or hollow spherical segmental surface 23 provides, what may be designated, a thrust responsive surface effective under thrusting pressure applied perpendicularly to the face plane of the latch segment body to both laterally shift or centralize and move said body radially outward through the housing opening or slot 21 within which it lies.

The inwardly presented or rearward face of each latch segment 22 is formed along its inner marginal portion with an inwardly and downwardly inclined male camming portion 25, disposed concentric to the curvature of said latch segment body, whereby, at proper times, to cooperate with the female camming portion 14 which borders the latch socket 13 of the male member spigot portion 12.

Slidably mounted on the female coupling member 15 is an external manipulatable slide ring 26. This slide ring is provided, in its internal face, with an annular latch segment receiving channel 27, the rearward wall of which is chamfered to provide an inclined cam section 28. When the slide ring 26 is retracted to latch segment releasing position (as shown in Fig. 2), its receiving channel 27 will register in alignment with housing openings or slots 21 of the bell-portion 17, so as to be disposed to receive the latch segments 22, when the latter are thrust radially outward through said openings or slots 21.

Means is provided for both properly limiting the sliding movements of the slide ring 26, as well as to detain or releasably hold the same against accidental displacement from either its retracted or advanced position, as the case may be. Such means, in one form thereof, comprises an outwardly open countersunk guideway 29 formed and suitably located in the external surface of the female member 15. Threaded through said slide ring 26 is a stop-screw 30, the end 31 of which is entered in said guideway 29, whereby abutment thereof against the rear end of said guideway arrests rearward movement of the slide ring 26 and determines its retracted latch segment receiving position, and abutment thereof against the forward end of said guideway arrests forward movement of the slide ring and determines its advanced latch segment actuating position. Said stop screw 30 is provided with an axial bore 32 in which is carried a detent ball 33 urged by a compression spring 34 toward the bottom of said guideway 29; said spring is backed by a tension regulating screw 35 which is threaded into the outer end of said stop-screw bore 32. Formed in the floor of said guideway 29, respectively adjacent to its rearward and forward ends, are depressed ball receiving seats 36 and 37 into which the ball 33 is thrust and yieldably held accordingly as the slide ring 26 is disposed in retracted or advanced position, whereby to retain the latter in a given position against accidental displacement therefrom (see Fig. 7).

When the slide ring 26 is retracted to the position shown in Fig. 2, its latch segment receiving channel 27 will be registered in alignment with the housing openings or slots 21 in which the latch segments 22 are contained. Since the latch segments 22 are freely movable or floating in said housing openings or slots 21, they may gravitate either inwardly or outwardly, according to the position of the female member 15. If, as shown in Fig. 2 for example, the female member 15 is so positioned that one latch segment lies at its upper side and the other at its lower side, the lower latch segment will drop into the latch segment receiving channel 27, and will thus be withdrawn from the path of movement of a male member spigot portion 12 into the bell portion 17 of the female member, but the upper latch segment will drop to projected position within said bell portion, and will thus lie in the path of movement of said spigot portion into the bell portion, and must be displaced from said path in order to allow said spigot portion to pass into and fully enter said bell portion. One of the features of this invention is to provide a latch segment formation of such novel character that entering contact of the spigot portion 12 of the male member will easily and quickly so displace the latch segment. To this end the concave or hollow spherical segmental surface 23 is provided at the forward side of each latch segment 22. When the male member spigot portion 12 is pushed into the female member bell portion 17, a point of its curved peripheral end edge will engage and thrust against a point of the thrust responsive surface 23 of a latch segment lying in the path thereof. Owing to the concave or hollow spherical segmental contour of said surface 23, the pressure of the spigot portion point thus engaging the same has a two-fold effect, (1) to tend to laterally shift the latch segment to a centralized position in the containing housing opening or slot 21, and (2) while at the same time urging the latch segment radially outward through said housing opening or slot 21 and into the slide ring channel 27 (see Fig. 3), and thus out of the path of the inwardly moving spigot portion, whereby to ride over the latter until the latch socket 13 thereof is disposed beneath said latch segment.

When the male member spigot portion 12 is entered in said female member bell portion 17, the extremity of the former will be stopped against the gasket 19 at the back of the latter, whereupon the members are ready to be locked together by manipulation of the slide ring 26. To this end, the slide ring 26 is advanced, and, as it is moved forward, its cam section 28 engages and thrusts against external peripheries of the latch segments 22, thereby moving the latch segments radially inward so as to project the same into the latch socket 13 of the entered spigot portion 12. As said latch segments 22 are thus forced into the spigot portion latch socket 13, the male camming portions 25 of said latch segments will engage and strongly thrust against the female camming portion 14 of the spigot portion latch socket, whereby to exert a strong inward axially directed pressure upon the spigot portion, and thereby move the extremity of the latter strongly against the yielding gasket 19, so as to compress the latter, and thus effect a tight leakproof and sealing joint between the connected coupling members (see Fig. 4). This is another novel feature of the latch segment and spigot portion structure.

Having now described our invention, we claim:

1. A coupling comprising a male member having a spigot portion, said spigot portion having an external annular latch receiving socket, a female member having a bell portion to telescopically receive the spigot portion of said male member, said female member having a transverse housing opening piercing the wall thereof to communicate with the bell portion interior, an arcuate latch segment floatingly and radially movable in said housing opening, said latch segment being provided along the inner marginal portion of its forward side with a thrust responsive face of hollow spherical segmental contour disposed generally angular to the plane of said forward side, a manipulatable external slide ring mounted on said female member, said ring having an internal annular channel adapted, when said ring occupies a retracted position, to be aligned with said housing opening for reception of said latch segment when the latter is moved radially outward from said opening, and said slide ring channel being bounded on one side by a cam portion operative to move the latch segment inwardly into engagement with said spigot portion latch receiving socket when said slide ring is advanced.

2. A coupling comprising a male member having a spigot portion, said spigot portion having an external annular latch receiving socket, a female member having a bell portion to telescopically receive the spigot portion of said male member, said female member having a transverse housing opening piercing the wall thereof to communicate with the bell portion interior, an arcuate latch segment floatingly and radially movable in said housing opening, said latch segment being provided along the inner marginal portion of its forward side with a thrust responsive face of hollow spherical segmental contour disposed generally angular to the plane of said forward side, said latch segment being further provided along the inner marginal portion of its rearward side with a male camming portion, said latch receiving socket of the spigot portion being provided at its forward side with a female camming portion to cooperate with said latch segment male camming portion, a compressible sealing gasket within the inner end of said female member bell portion, a manipulatable external slide ring mounted on said female member, said ring having an internal annular channel adapted, when said ring occupies a retracted position, to be aligned with said housing opening for reception of said latch segment when the latter is moved radially outward from said opening, and said slide ring channel being bounded on one side by a cam portion operative to move the latch segment inwardly into engagement with the spigot portion latch receiving socket when said slide ring is advanced, said inward movement of said latch segment operating to both lock said spigot portion and bell portion together and at the same time, by cooperation of said male and female camming portions, to thrust the spigot portion extremity into compressing and joint sealing engagement with said gasket.

HOWARD C. KRONE.
WILLIAM MEYER.